United States Patent [19]
Johnson et al.

[11] Patent Number: 5,923,885
[45] Date of Patent: Jul. 13, 1999

[54] ACQUISITION AND OPERATION OF REMOTELY LOADED SOFTWARE USING APPLET MODIFICATION OF BROWSER SOFTWARE

[75] Inventors: Mark R. Johnson, Smyrna, Ga.; Terry B. Cline, Palo Alto, Calif.

[73] Assignee: Sun Microsystems, Inc., Palo Alto, Calif.

[21] Appl. No.: 08/741,959

[22] Filed: Oct. 31, 1996

[51] Int. Cl.[6] .............................. G06F 9/445; G06F 15/16
[52] U.S. Cl. ............................................ 395/712; 345/326
[58] Field of Search .................................... 345/326, 333, 345/334; 395/712

[56] References Cited

U.S. PATENT DOCUMENTS

| | | | |
|---|---|---|---|
| 5,742,768 | 4/1998 | Gennaro | 395/200.33 |
| 5,757,925 | 5/1998 | Faybishenko | 706/47 |

OTHER PUBLICATIONS

L. Hanson, Everything you wanted to know about the Mac, Hayden Books, pp. 55–72, 415–417, Dec. 1993.
L. Poole, "System 7.5," MacWorld, pp. 126–129, Sep. 1994.
R.C. Kennedy, "The Elegant Kludge," Byte, pp. 54–60, Aug. 1995.
S. Diehl, "Applications 95 Arrive," Byte, pp. 117–122, Oct. 1995.
"Adobe tips Internet strategy," The Seybold Report on Desktop Publishing, vol. 10(9), p. 25(2), May 1996.
D.S. Linthicum, "4.0 Isn't for Everyone," Byte, pp. 121–126, Jul. 1996.
K. Ostertag, "A Windows utility that's KEY," VARbusiness, vol. 12(14), p. 42, Sep. 1996.
G. Tribble, "Java computing in the entriprise: revolution," Computer Reseller News, n. 706, p. 71(4), Oct. 1996.
F. Hayes and S. Gaudin, "Sun Client Undercuts PC costs," Computerworld, vol. 30(44), p. 8, Oct. 1996.
L. Wirthman and M. Moeller, "JavaStation NC and new tools due from Sun," PC Week, vol. 13(43), p. 1(12), Oct. 1996.
P. Wayner, "X terminal+browser+Java=Web PC," Byte, vol. 21(10), p. 50, Oct. 1996.
R.L. Hummel, "Running on NT," Byte, pp. 126–130, Oct. 1996.

*Primary Examiner*—Robert W. Downs
*Attorney, Agent, or Firm*—Beyer & Weaver, LLP

[57] ABSTRACT

Methods, systems, and software for installing and operating selected software applications on a client computer that is in communication with a server computer on a computer network is described. In one aspect, a method for installing and operating a selected software application on a client computer that is in communication with a server computer across a computer network. In one embodiment, browser software is provided on the client computer that includes a browser user interface and is effective to identify and download selected software applications from the server onto the client computer for execution thereby. A data transfer communication link is established between the client and server computers across the network, a desired software application is selected using the browser, and the desired software application is transmitted across the network from the server to the client. The browser user interface is then transmuted into the user interface of the desired application to allow operation of the downloaded software application using the transmuted browser user interface. Using the methods, systems, and software described herein, software can be distributed to client computers without the installation and other management difficulties common with managing software on multiple computer systems. More importantly, the methods, systems, and apparatus provided by the present invention allow for the distribution of software that is platform-independent; thereby freeing network and system administrators—and users—from the frustrations and difficulties created by the need to manage various platform-dependent versions of software.

65 Claims, 11 Drawing Sheets

ACQUISITION AND OPERATION OF REMOTELY LOADED SOFTWARE USING APPLET MODIFICATION OF BROWSER SOFTWARE

BACKGROUND OF THE INVENTION

1. The Field of the Invention

The present invention relates to network computing and, more specifically, to the transmission and operation of software distributed across computer networks. Still more specifically, the present invention includes a method, apparatus, and software for dynamically modifying computer interfaces so that users can access and operate software distributed across a computer network.

2. The Relevant Art

Prior to the rise of the personal computer, computer users were limited to operating software that ran on large, mainframe computers using terminals that typically included a keyboard for entering data and commands and a video display device (or printer) for viewing output. Although mainframes provided very powerful computing platforms, they suffered from serious drawbacks. In particular mainframes were expensive to install and operate and they required all users to be connected directly to the mainframe through a terminal, which limited access to the mainframe for many people. In addition, users had very limited control over their computing environments, usually having to adapt their work styles and problems to suit the software and administration of the mainframe computer.

Beginning in the late 1970's personal computers began to overtake mainframes as the dominant computing platform for both personal, business, and scientific uses. For single users, personal computers often could provide the same computing speed as the older mainframes that had to accommodate many processing jobs simultaneously. In addition software that ran on the personal computers became more "user-friendly", allowing computer users to adapt both the computer and the software to suit their particular computation needs. The release from requiring a connection from a terminal to a mainframe allowed personal computers to be located just about anywhere within an organization or at home. This capability further assured the dominance of the personal computer over the mainframe as computing power could be located at sites where it was needed. No longer did users have to tailor their operations around large, expensive, finicky mainframe computing centers.

As the computing power and data storage capacities of personal computers exploded throughout the 1980's the dominance of the personal computer seemed to be assured. As the 1980's drew to a close, however, a new phenomenon began to emerge which appears likely to overtake the personal computer revolution of the past two decades. Today, ever increasing numbers of personal computers are linked to each other through high speed data networks. The most popular network currently is the "Internet"—the network comprising various business, academic, and personal computer sites across the globe. The popularity of the Internet, and, more particularly, that aspect of the Internet referred to as the "World Wide Web", has prompted many organizations to form internal computer networks—the so-called "intranets". This interest in network computing has been sparked by a combination of high speed data networks and increasingly sophisticated network servers, routers and other devices which allow many independent personal computers to communicate efficiently.

The attractiveness of the World Wide Web stems in part from its highly visual character, the same factor that played a large role in the rise of the personal computer and its dominance over the mainframe. Typically, the World Wide Web is organized into various "web sites" which typically comprise a server that transmits data to a client computer running a "browser". The browser is software that provides the user with a window and various controls through which data from the server can be viewed and navigated. A particularly useful feature of World Wide Web data is its ability to be linked through hypertext commands so that users can quickly navigate from one document to another and even from one web site to another through very simple intuitive commands such as the activation of a mouse button. Using the World Wide Web, users can view text, graphics and hear sounds from sites all over the globe. In addition users can also download new software, or software capable of modifying programs already installed on the client computers. These same features available to users of the World Wide Web on the Internet can also be provided to users of a local network through an intranet. This capability has received increasing attention from many organizations as information useful to employees carrying out their assignments can be distributed quickly throughout the network to personal computers within the organization.

However, the use of modern networks for such a widespread distribution of information and software points to a drawback regarding the highly decentralized nature of personal computers. Because users have so much control over their computing environments, and because of the need to maintain individual copies of software packages on individual computers, the management of computer networks is becoming increasingly difficult. With so many remote computers connected to each other over computer networks, administrators are finding it difficult to insure that each user has a computer system that is configured to operate reliably and efficiently. Particular problems include the maintenance of current software revisions, modifications made to the operating system and software by the users, the installation of extraneous software on the local computer which is not required for performing the central tasks of the user, and the need to buy multiple copies of a single software package even if that package is used only sparingly. More important is the need to support software that runs on different computer platforms, such as UNIX, Macintosh, and Windows, as several platforms are often used in organizations to perform different functions. For example, an organization might use Windows-based computers for running accounting software, Macintosh computers for graphics and design, and UNIX systems for network administration and high-end computation applications such as scientific or engineering calculations, or computer-aided design ("CAD") or computer-aided engineering ("CAE") functions. This forces organizations to purchase multiple copies of the same software application to accommodate those uses that are common to all platforms (e.g., word-processing or database access).

Thus, it would be of great benefit to computer users, and especially computer users within organizations in which multiple computer users are connected through a computer network, to provide methods and systems for disseminating both information and software over the network so that the above-described problems associated with highly decentralized computer networks can be mitigated. As will be described here and below, the present invention meets these and other needs.

SUMMARY OF THE INVENTION

The present invention addresses the above-described difficulties in managing software distribution across networked computer by providing, in one aspect, a method, system, and software for installing and operating selected software applications on a client computer that is in communication with a server computer on a computer network. Using the methods, systems, and software described herein, software can be distributed to client computers without the installation and other management difficulties common with managing software on multiple computer systems. More importantly, the methods, systems, and apparatus provided by the present invention allow for the distribution of software that is platform-independent; thereby freeing network and system administrators—and users—from the frustrations and difficulties created by the need to manage various platform-dependent versions of software.

In one aspect, the present invention provides a method for installing and operating a selected software application on a computer. According to one embodiment of the method of the invention, browser software is provided on the computer. The browser software includes a browser user interface and is effective to identify and download selected software applications for execution. A desired software application is selected using the browser. The browser user interface is then transmuted into the user interface of the desired application to allow operation of the downloaded software application using the transmuted browser user interface.

In one embodiment, the selected software application is located on a server computer that is coupled with the computer through a computer network, and a set of properties settings are loaded into the memory of the computer that are effective to transmute the browser user interface into the software application user interface when the set of properties settings are exchanged for a set of property settings corresponding to the browser user interface. The original properties settings are stored so that the browser user interface can be restored to its original form when the user desires to return to the browser's functionality. The storage of the browser's interface parameters can be performed by either the browser or the selected software application.

In another embodiment, the selected software is an applet, and, in a more specific embodiment, an applet written in the Java programming language. In one embodiment of the present invention, the software application is a Java applet or an applet written in the Java programming language, and the above-described first and second sets of properties settings each comprise software objects such that the software object defining the set of second properties settings has an inheritance relationship with the software object defining the first set of properties settings, in which the default values of the second set of properties settings are the properties settings of the first set of properties settings. The step of transmuting the browser software user interface into the software application user interface includes substituting selected default values of the second set of properties settings with properties settings corresponding to the software application user interface.

In some embodiments the browser user interface includes one or more frames from which software applications can be selected independently. The frames include a base frame which is associated with a first set of properties settings. Each of the user interfaces of the selected software applications selected from the frames is associated with a set of properties settings. These properties settings each comprising software objects having an inheritance relationship with the software object defining the first set of properties settings for the base frame. According to this particular embodiment, the step of transmuting the browser software user interface into the software application user interface(s) of the selected software application(s) includes substituting selected values of the first set of properties settings with properties settings corresponding to the software application user interface(s).

In another aspect, the present invention includes a computer system for executing a selected software application on a computer. In one embodiment, the computer system includes a computer coupled with at least one memory device which holds therein browser software including a browser user interface, which browser software is effective to identify a selected software application for execution by the computer. The selected software application is effective to transmute said browser user interface into the software application user interface to allow thereby operation of the selected software application using the transmuted browser user interface when the software application is executed by the computer.

In yet another aspect, the present invention provides a computer-readable medium that comprises computer-readable program code devices that are configured to display a browser user interface which is effective to control browser software operating on a computer. Program codes devices are also provided that are effective to display at least one software application stored on memory coupled with a remote computer using the browser user interface, the software application having an application user interface, and to identify a selected software application from the remote computer for transfer to the computer. Program code devices are further provided such that the transfer of the selected software application from the remote computer is effective to transmute the user interface of the browser into the user interface of the software application so that the software application can be operated using the transmuted user interface.

These, and other aspects and advantages of the present invention, will become apparent when the Description below is read in conjunction with the accompanying Drawings.

BRIEF DESCRIPTION OF THE DRAWINGS

FIG. 3A illustrates a typical browser interface such as used to view text and graphics over the World Wide Web on the Internet or from a intranet server. FIG. 3B represents a browser interface which has been modified using the methods and apparatus described herein to provide a different functionality to the user.

DESCRIPTION OF SPECIFIC EMBODIMENTS

The present invention provides, in one embodiment, a method, apparatus, and software for dynamically modifying a browser interface to provide software functionalities that are distributed from a server across a network to a user working on a client computer which is coupled to the server through the computer network.

Figure 1:
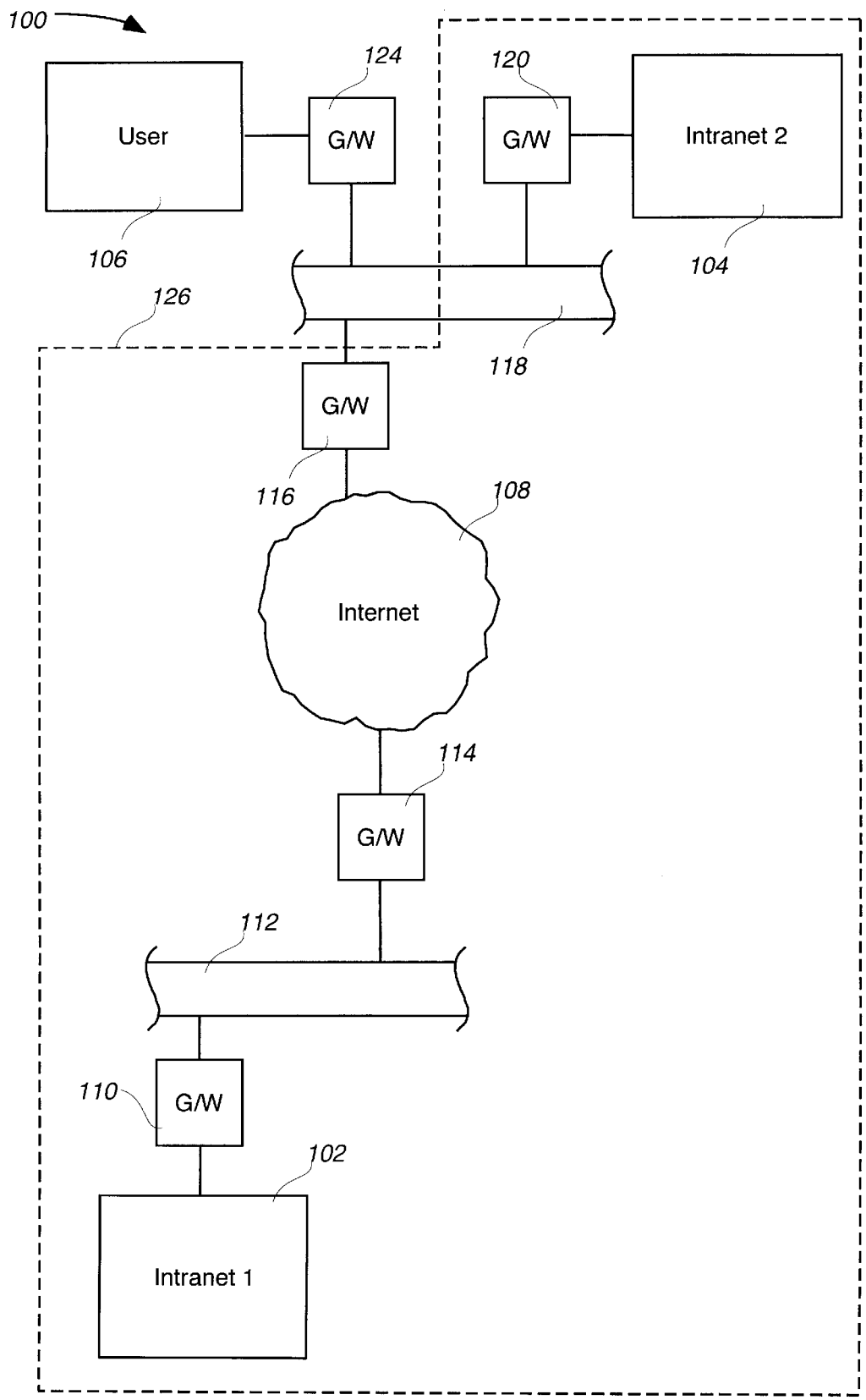
FIG. 1 illustrates a wide area computer network in which both computers and intranets are coupled by a computer network through the Internet.

An illustration of one network in accordance with the present invention is provided in FIG. 1. Included in the network illustrated in FIG. 1 are intranets 102 and 104 and an individual computer shown at 106. The structure of intranets 102 and 104 is described in greater detail below with respect to FIG. 2. Both of the intranets and the computer are connected to the computer network through a variety of computer gateways ("G/W"). In some embodiments, the computer network includes the Internet. Referring to FIG. 1 more specifically, intranet 102 is coupled with intranet 104 and computer 106 through the Internet which is shown generally at 108. The connection between intranet 102 and Internet 108 is provided first through a gateway 110 which is coupled with intranet 102 and a "backbone" or high capacity dataline 112. Data from a high capacity line 112 is routed through gateway 114 through Internet 108 which data passes through a second gateway 116 and into high capacity dataline shown at 118. It will be appreciated by those of skill in the computer network arts that dataline 118 can be the same as dataline 112 or may represent a separate backbone to which various other individuals and networks are coupled.

Data that travels from intranet 102 through the Internet and over high speed dataline 118 passes through gateway 120 to intranet 104 or through gateway 124 to computer 106. Thus according to the illustrated embodiment data can be passed among computer 106 intranet 104 and intranet 102. In particular, the data may travel through the Internet 108 as just described, or may pass across the backbone 118 between the user and intranet 104. In some embodiments intranet 104 and intranet 102 can be coupled or directly through network configurations known to those of skill in the art as "extranets". Extranets are network arrangements in which a given network or individual is coupled with a remote network through a dedicated data connection. This connection may include data that is routed through the Internet, as illustrated in FIG. 1, or may be a direct data feed, such as through an ISDN or T-1 dataline. Various configurations in addition to the methods and materials for establishing such configurations will be apparent to those of skill in the computer network and telecommunications arts.

Figure 2:
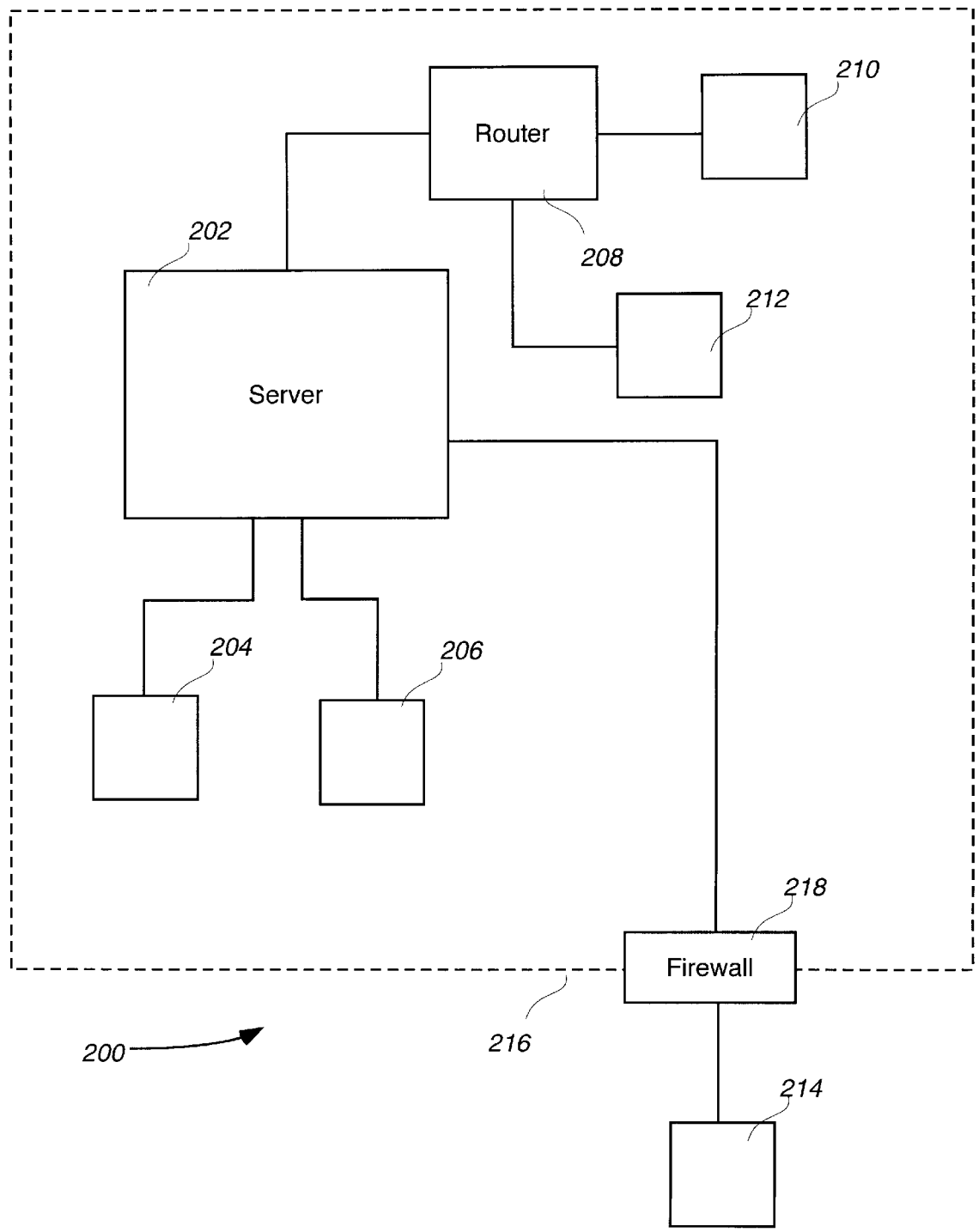
FIG. 2 is a schematic representation of intranet such as illustrated in FIG. 1.

One embodiment of an intranet, such as illustrated in FIG. 1 at 102 or 104, is provided in FIG. 2 at 200. A typical intranet includes a server 202 which is coupled with clients 204 and 206. In addition the server can be coupled to other client computers such as shown at 210 and 212 through a router, hub or similar data transfer device such as shown at 208. In addition, external users such as shown at 214 can be connected to the server either through a direct line or through the use of telephone lines using, e.g., a modem or similar device. In some cases, access to the intranet will be controlled to a high degree by a "firewall" configuration which is illustrated by the dashed box 216. The establishment of communications from users external to the firewall, such as user 214, can be achieved by traversing a gateway which allows access to the protected server. Such a gateway is illustrated at 218.

Typically the server provides data and software that is accessible to the various clients which are in communication with the server, either directly or through a device such as a router. The construction, maintenance, and operation of the server, router, and various client machines will be well known to those of skill in the art. In particular, however, the server 208 will be configured to provide data that is compatible with browser software such as that used to view data on the World Wide Web as described above. In particular, the data provided by the server will be in the form of pages of data that can be examined using typical browser software. In one embodiment, the server and clients are configured to exchange not only data but computer software applications and, more particularly, software in the form of "applets", such as those written in the Java programming language available from Sun Microsystems of Mountain View, Calif. The term "applet" as used herein refers to a software code that is executed in the context of software already running on the remote computer (see Flannagan 1996). In one embodiment, the software in context with which the applet runs is the above-described browser software. Typically, applets provide additional functionalities to browser software by performing various computational tasks which the browser software itself is not configured to perform. Thus, users who download applets can provide the browser software with additional functionalities that are not otherwise available to the browser software.

According to one embodiment of the present invention, the software application, and, more particularly the applet software, that is downloaded by the user functions to provide not only additional functionalities but is effective to modify the browser interface so that user is presented with, in effect, a different computer program. Thus, by downloading applets using the method and systems of the present invention, users can access software in a platform-independent fashion from a remote server and operate that software as if it were already installed on their local computer platform. Because applets, such as Java applets or an applet written in the Java programming language, can function in a platform-independent manner (Flannagan 1996) it will be appreciated that the present invention provides a way of distributing software in a platform independent manner that allows users to execute software without having that software installed on their local machines. The advantages provided by such an arrangement include the ability of users to have access to the latest revisions of software without having that software installed on their local machines, having access to software for only those periods of time which the user requires the services of that software thus avoiding the need to purchase expensive software that is used only sparingly, and to have access to highly specialized software that may otherwise be available only on a specific and highly specialized computing platforms.

However, it will also be appreciated that the above-described application and applet software used to modify a browser to allow a user to run a variety of software applications over a network can be used with a single computer without connection to a computer network. In this case, the application software (or applet) used to modify the browser will reside in data storage coupled with the computer. For example, large numbers of applets that are effective to modify a browser's interface as described herein can be provided on a high-density storage medium, such as a CD-ROM. A user can then use a browser (which can also be provided on the CD-ROM) having links to each of the applets to easily browse the applet software available on the CD-ROM, select one or more desired applets, and run the applets directly through the browser interface as described below. Such an arrangement would obviate the need for the user to traverse labyrinthine file structures and launch and quit various applications. The browsing and control of the application(s) is performed within the context of the browser software.

Figure 3A:
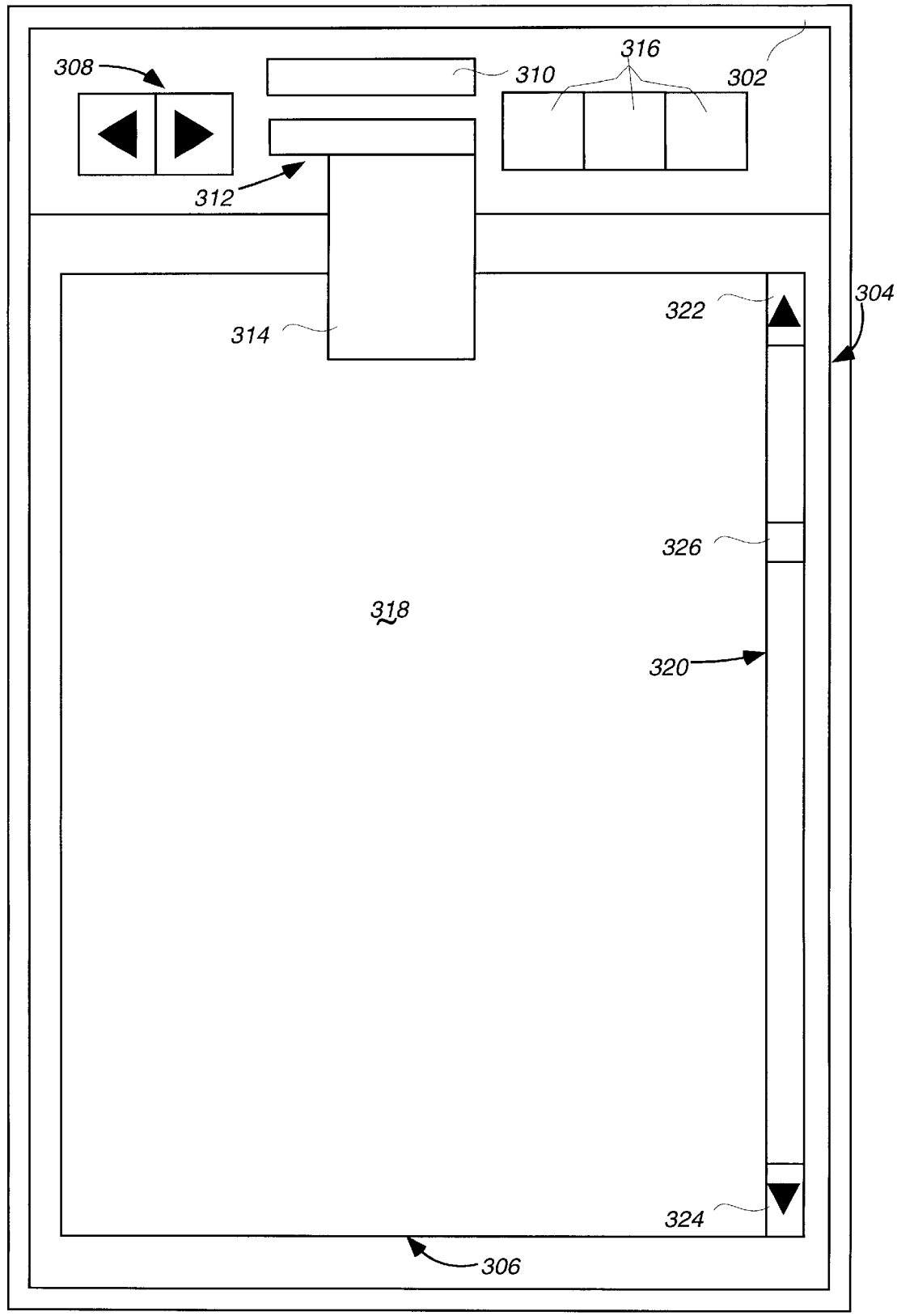
FIGS. 3A and 3B illustrate the modification of a browser interface in accordance with an embodiment of the present invention.
Figure 3B:
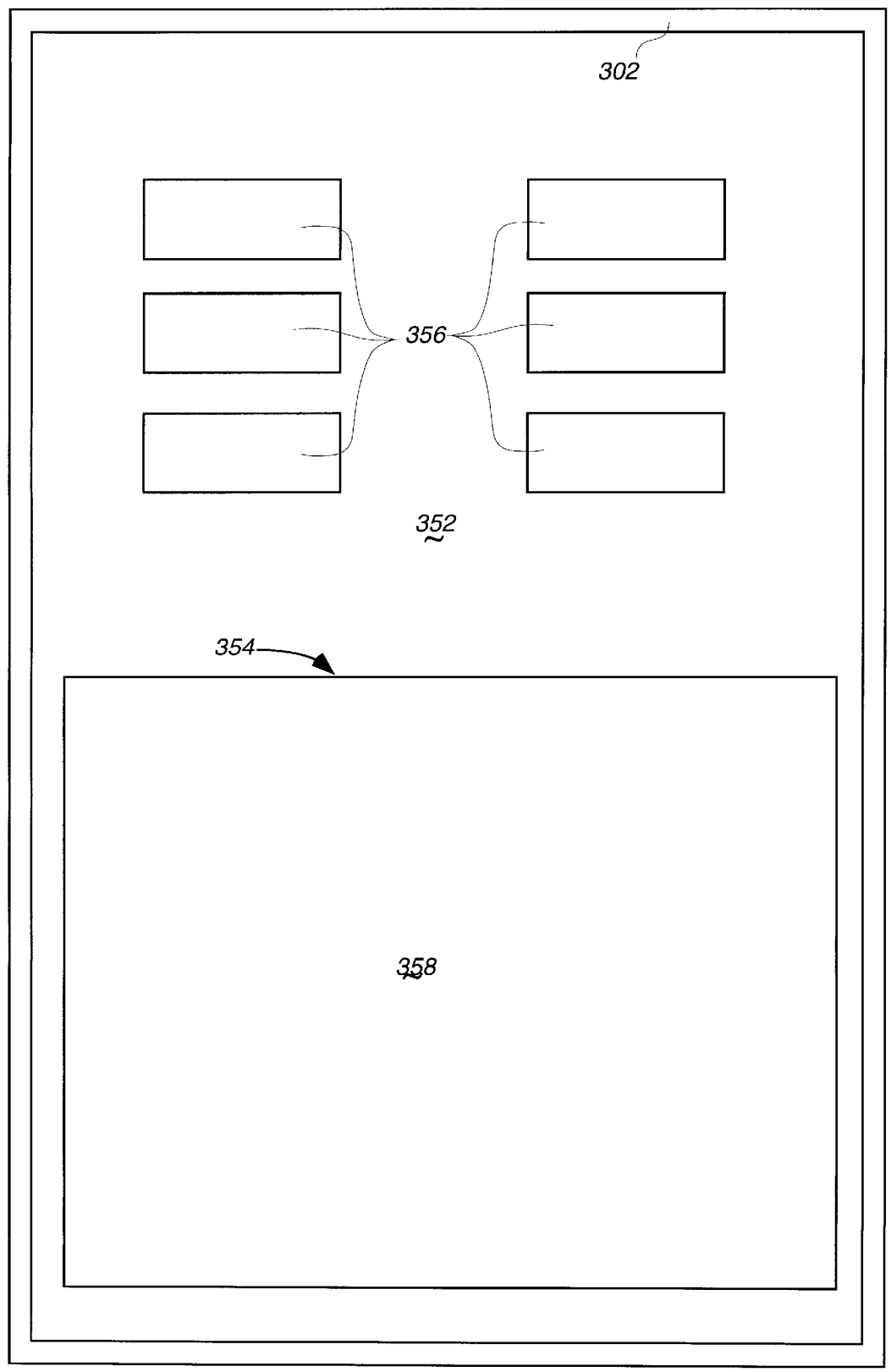

The operation of the invention is described in greater detail with respect to FIGS. 3A and 3B. FIG. 3A illustrates a browser interface such as any Java-capable browser available commercially. Such browsers include HotJava from JavaSoft of Cupertino, Calif., Netscape Navigator available from Netscape Communications, Inc. of Mountain View, Calif. and Microsoft Explorer available from Microsoft Corporation of Redmond, Wash.

Referring to FIG. 3A, typical browser interfaces, such as that shown 300, include a window frame 302 which encompasses a control region 304 and a viewing region 306. Control region 304 typically includes page controls 308 which allow users to navigate between various pages of data provided by a server such as described above, a text entry window 310 for entering various data required by the browser, e.g., URL addresses or responses to queries, pull-down menus which include a pop up bar shown at 312 which, when activated, display a menu of options such as shown at 314, in addition to various other buttons that activate features and utilities which are shown generally at 316. Viewing region 306 typically includes a viewing area 318 which viewing area provides a region into which text, hypertext links, and graphics are displayed to the user for examination. Often the viewing area includes a scroll bar such as shown at 320 which scroll bar further includes navigation buttons such as shown at 322 and 324 and a "thumb wheel" 326 all of which allow the user to scroll text up and down for examination.

According to one embodiment of the present invention, applets are provided which not only allow the user to execute specialized software different from the browser software with which the user activates the applet, but which applet software transforms the browser interface to provide an interface that is specific for the functionality that the applet executes. An example of such a transformed interface is provided at 350 in FIG. 3B. As shown in FIG. 3B, the transformation of the browser window provides a window which includes the original window frame 302 but which otherwise has completely changed the interface presented to the user. The degree to which the browser's interface is changed, will, of course, depend on the nature of the application software.

Thus, in the illustrated example the control surface and data windows have been modified to provide a more extensive control area 352 and a somewhat smaller and fixed data viewing region 354. Control region 352 may contain a variety of data elements that may be the same as, or different from, those of the original browser window. For example, the control region 352 in the illustrated exemplary embodiment includes a variety of buttons 356 and the data viewing region 354 includes a window 358. It will be appreciated, of course, that the actual interface of both the browser and the applet will vary according to the features and functionalities provided for each type of software. Thus, in cases where database functionalities are provided by the applet the buttons 356 may include commands such as sort, query generation commands, buttons to allow the entry of new records and the deletion of old records, as well as buttons to cause the termination of the execution of the applet and the reconfiguration of the interface to return the user to the browser interface. In accordance with such an embodiment, the data presentation region 358 may provide nothing more than a window into which textural data is displayed in accordance with the commands provided by the user through the control area 352. Of course, as mentioned above, the specific configurations will vary according to the functionalities and interface design of the particular browsers and applets being used and will be familiar to those of skill in the art.

Figure 4:
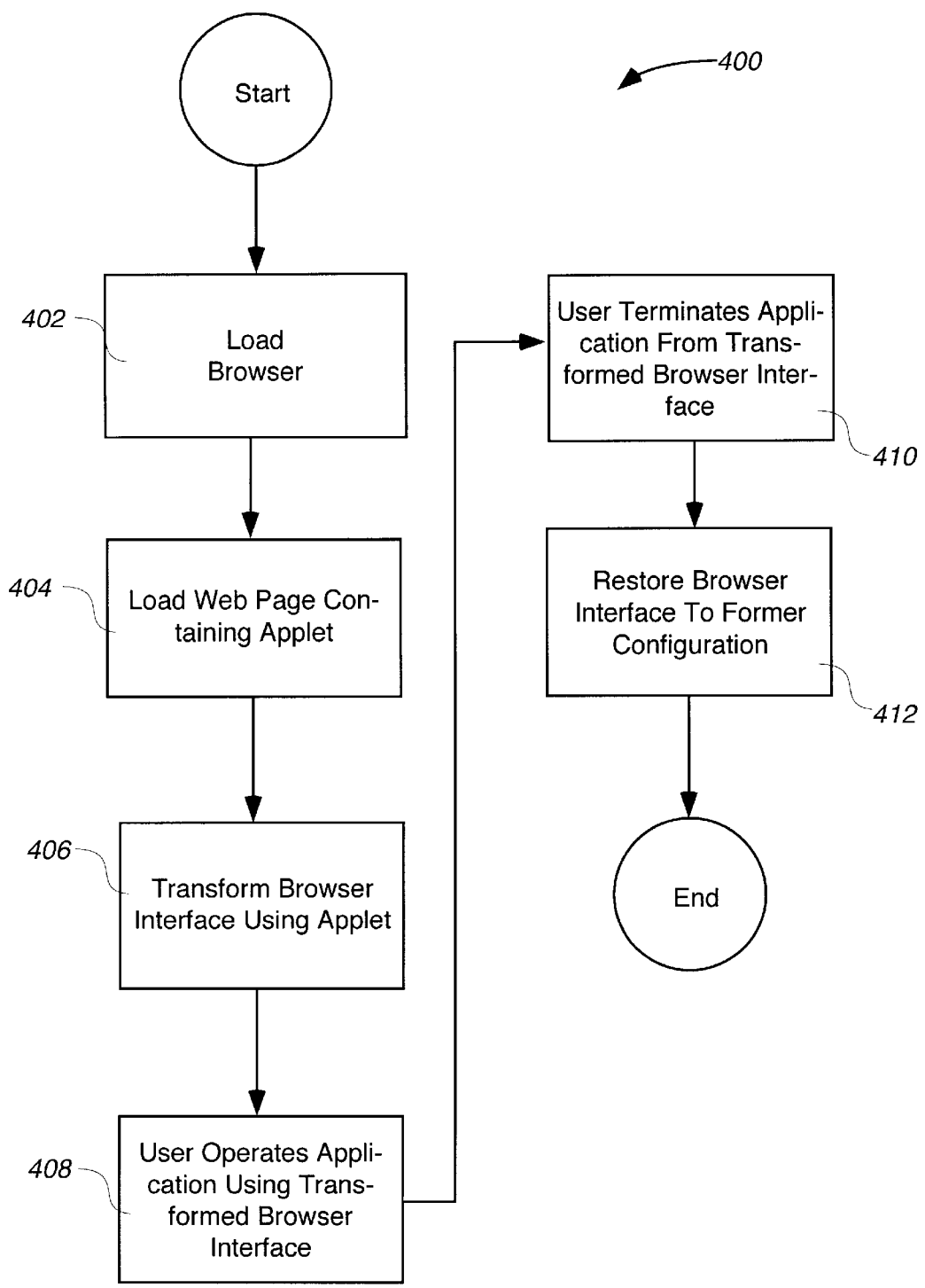
FIG. 4 is a flowchart outlining one embodiment of the method of the present invention.

One embodiment of a method by which the aforementioned transformation is accomplished is shown at 400 in FIG. 4. As shown therein, the user first loads the browser software at step 402. In one embodiment, the browser software is installed on the local client machine and is executed by the user directly from the client. Alternatively, the browser can be provided remotely across the network in which case the client machine is configured to respond more like a terminal than a stand-alone computing platform. The implementation of either configuration, and other configurations, will be apparent to those of skill in the art. Upon loading the browser, the user loads a web page which contains the desired applet to be executed at step 404. The loading of such web pages is performed using methods that are familiar to those of skill in the art. Upon loading the desired applet, the browser interface is transformed at step 406 such that a new interface is provided to the user which includes functionalities and displays that are consistent with the functionality of the applet as illustrated above with respect to FIGS. 3A and 3B. At step 408 the user operates the application, e.g., the applet, using the transformed interface after which the user terminates the applet at step 410 from a command generated and passed to the applet through the modified browser interface. Finally, at step 412, the browser interface is returned to its original configuration from which the user may either select another applet to be loaded into the client computer, and which may transform the browser interface again according to the sequence just described, or the user may terminate operation of the computer, or the user may execute software that is installed on the local machine.

Figure 5:
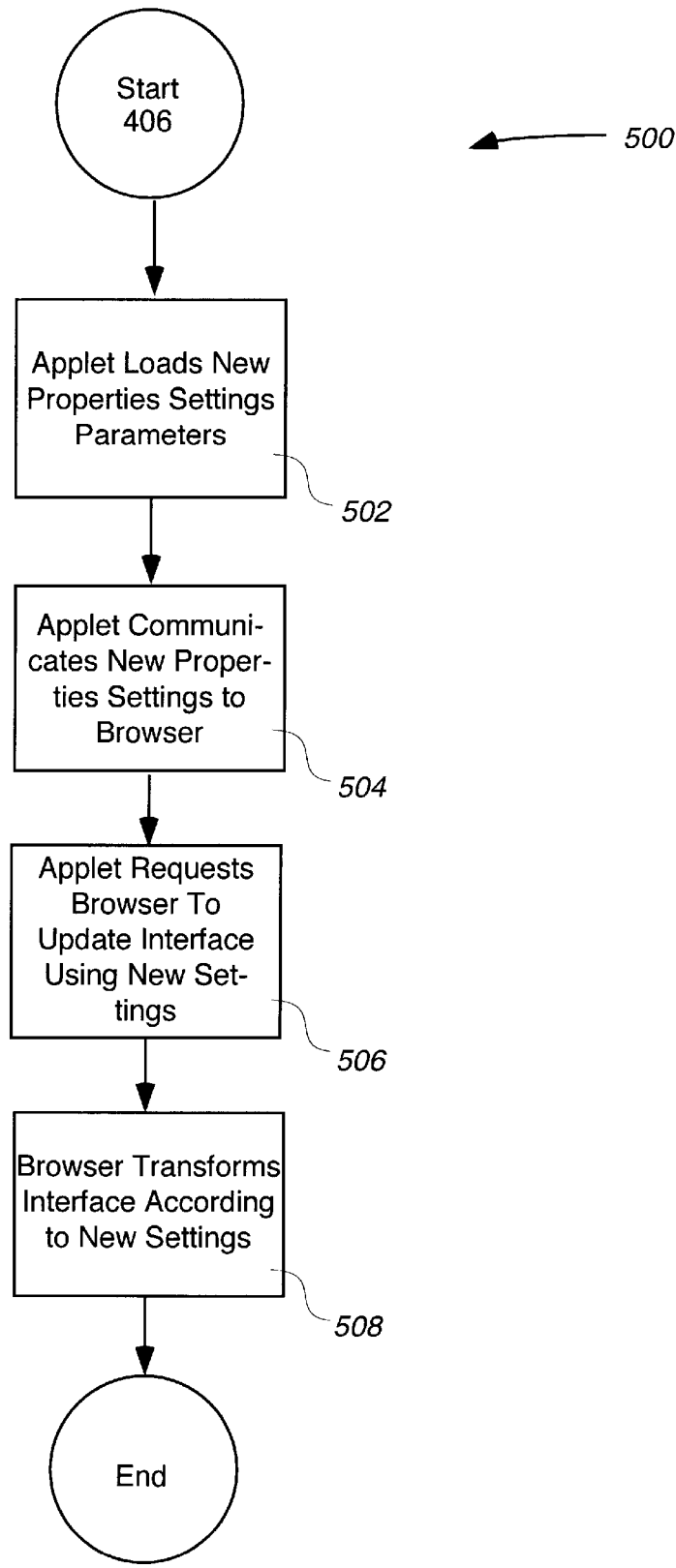
FIG. 5 is a flowchart illustrating in greater detail step 406 of FIG. 4 according to one embodiment of the invention.

Step 406 of FIG. 4, the transformation of the browser interface into a new interface that functions in accordance with the applet, is illustrated in greater detail at 500 in FIG. 5. At step 502 the applet which is now executing on the client computer, having been loaded from the remote server using standard techniques, acquires new properties settings that will be used to define the new functionalities to be presented in the transformed browser interface. The settings are typically stored on the server on which the applet is stored. However, the settings may be provided at other locations, such as different servers, or may be stored on the client computer system itself. At step 504 the applet communicates the new properties settings to the browser as will be described in greater detail below. Upon the communication of the new properties settings to the browser, at step 506 the applet requests the browser to update its interface using the new settings. At step 508 the browser transforms its interface as it updates its interface through the new properties settings that have been provided by the applet. This transformation relies on the same mechanisms used to construct the original browser interface and therefore will not be described in greater detail as such operations will be familiar of those of skill in the art.

Typical properties settings include any setting that is used to define what is displayed to the user in the browser window, including the functions that are initiated when any displayed controls (e.g., buttons) are activated by the user. Examples of such settings include those that provide menu bars, menu items, buttons, status messages, grow and shrink boxes, window dimensions, window location, background color, text labels, as well as the dimension, location, and presence of data fields. In addition, various page layout properties relating to the Hypertext Mark-Up Language ("HTML") such as font style, font size, typeface, font color, spacing, kerning, and/or leading can be controlled using the properties settings as well. It will be appreciated that changes made to the menu bar and menu items as described above can be used to add dynamically new functions using the remote code that is provided by the applet. In addition, the buttons defined by the new properties settings can also be used to implement new functions.

Figure 6:
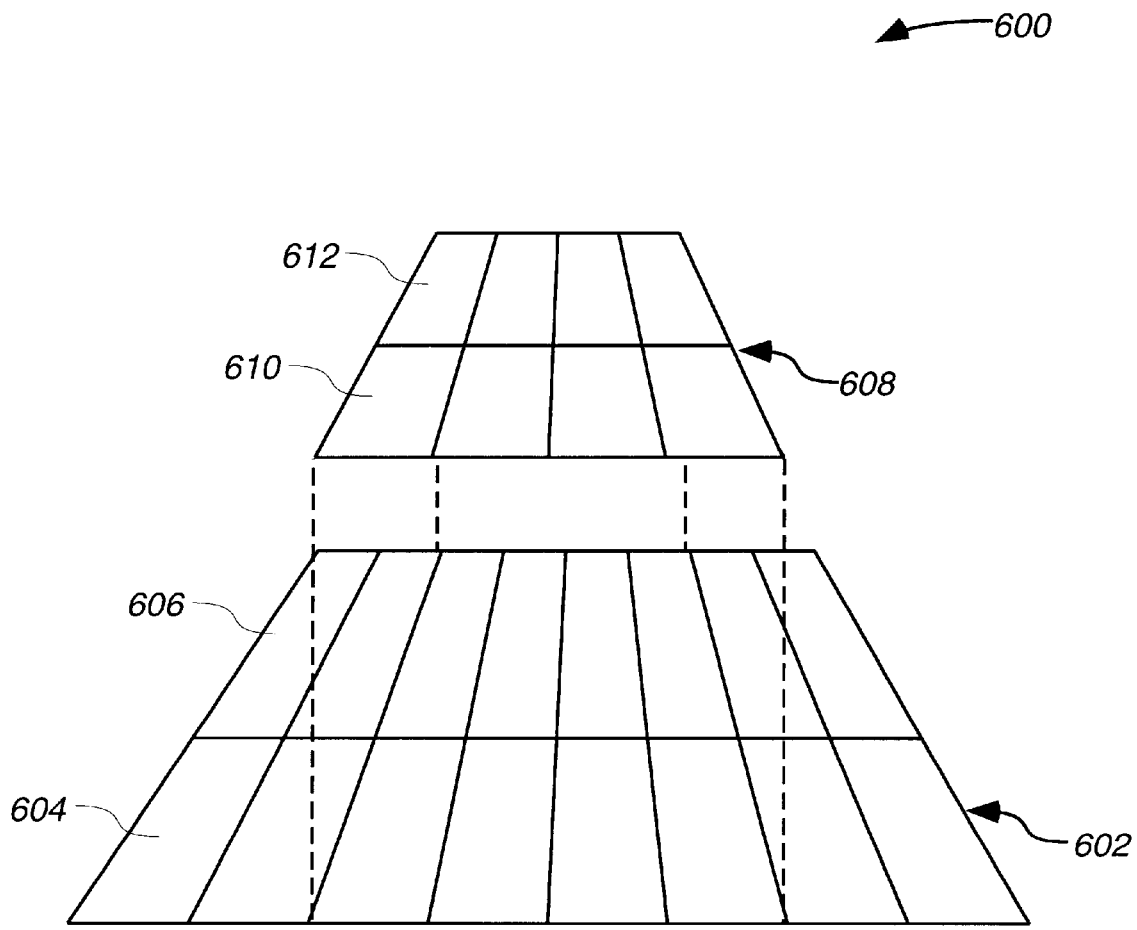
FIG. 6 is a schematic representation of one embodiment of a method for transforming a browser interface according to the present invention.

The method by which the applet communicates the new settings to the browser, as called out in step 506 of FIG. 5 are illustrated in greater detail with respect to FIG. 6. According to one embodiment of the present invention, advantage is taken of the Java™ programming language's properties class characteristics. As will be familiar to those of skill in the art of programming in the Java™ language, the properties class is defined in part to act as a container that is configured to maintain a list of browser interface properties names and their associated values. Such a table is illustrated at 602 in FIG. 6. The properties names and their associated values are provided in the regions indicated at 604 and 606 for the browser properties settings that are provided are originally and at 610 and 612 for the new properties settings that are provided by the applet. According to one embodiment of the invention each new instance of the properties class inherits values from the table from which the new properties class is created, i.e., the properties class for the browser. The applet provides the browser with the location of a new table that inherits its values from the original table for those items that are not changed. The new items provided by the applet replace the corresponding items of the original data used by the browser. Thus, as shown in FIG. 6, the central portion of the properties values of original table 602 are overwritten by the new values of table 608 which is downloaded by the applet from the remote server. Alternatively, the applet can simply overwrite the values already provided in the properties table that is created by the browser when the browser is initiated. In either case, either the applet or the browser should be configured to retain a copy of the original browser interface properties table so that the browser interface can be restored when the user exits the applet being used.

Figure 7:
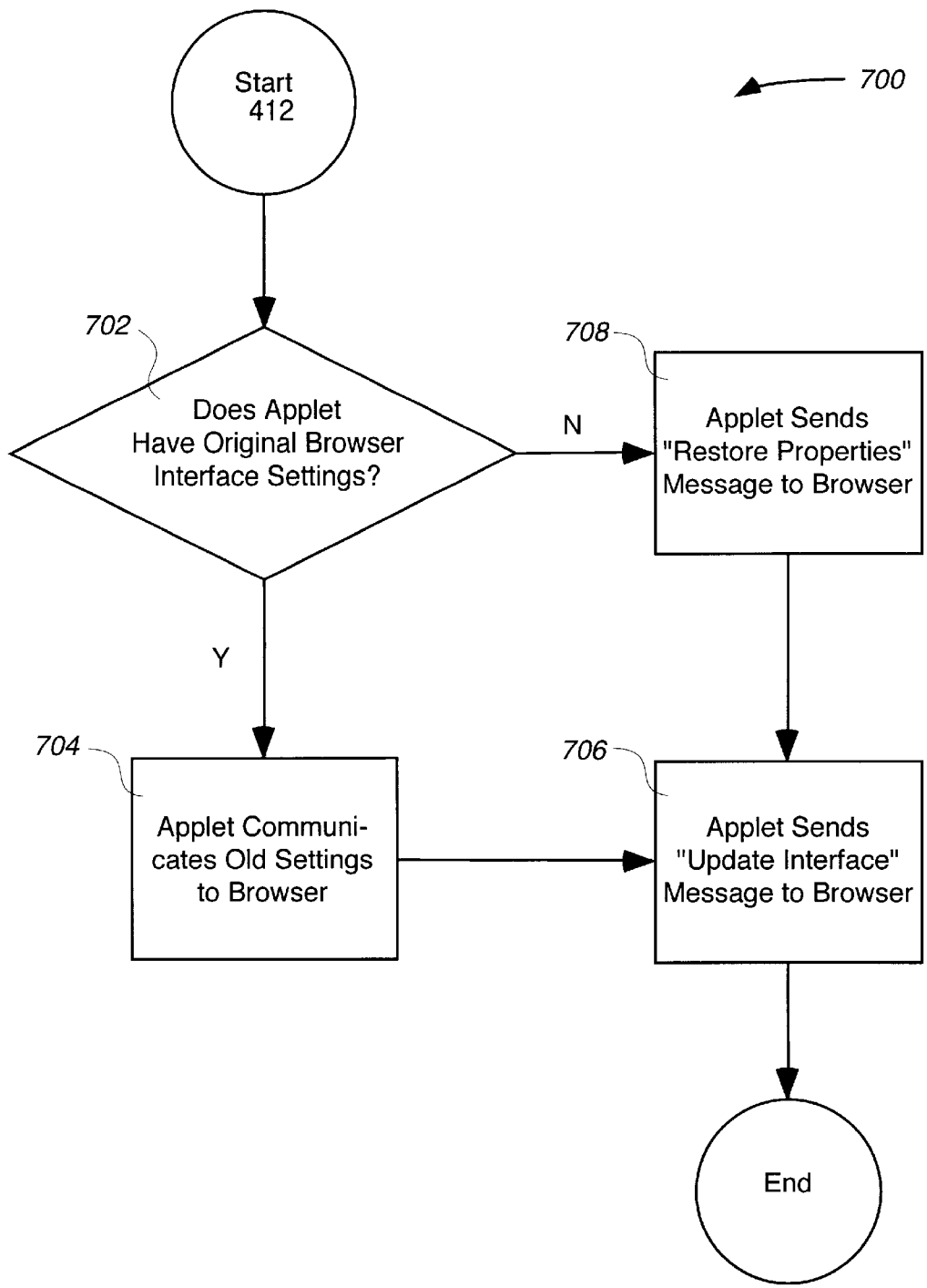
FIG. 7 is a flowchart illustrating step 412 of FIG. 4 in greater detail.

Step 412 of FIG. 4 in which the browser interface is restored following these termination of the applet, is shown in greater detail at 700 in FIG. 7. At step 702 a determination is made as to whether the applet or the browser is responsible for maintaining a copy of the original browser interface settings. If the applet has the original settings, then those settings are communicated to the browser, e.g., using the methods just described with respect to FIG. 6, or by redirecting the browser to a copy of the original properties table that has been placed in memory at a location different from the modified original table. At step 706 the applet then sends a "update interface" message to the browser to cause the browser to consult the copy of the original table to thereby restore its original settings and interface. Alternatively, if the browser is responsible for maintaining a copy of the original settings then the applet sends a "restore settings" message to the browser at step 708 which command is followed by the above-described "update interface" command to thereby cause the browser to restore its original interface. In conjunction with this the applet ceases execution and the user is returned to the browser interface such as shown in FIG. 3A from which the browser can select additional information through the browser.

Figure 8:
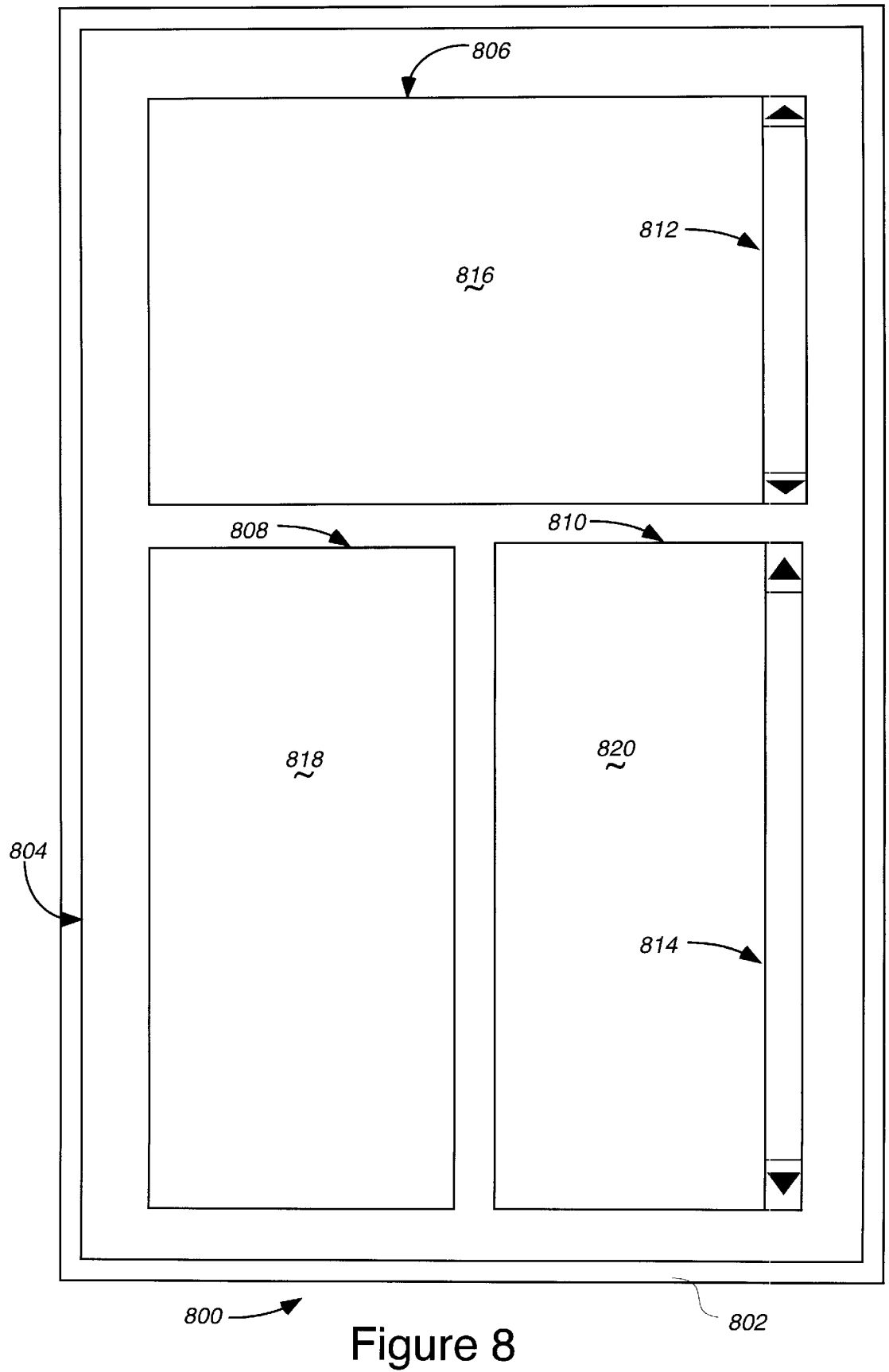
FIG. 8 is an illustration of a browser interface which includes three "frames" in which text and graphics can be viewed independently.

In one embodiment, the present invention is configured to work with browsers that include one or more "frames". A browser including various frames is illustrated at 800 in FIG. 8. The interface typically includes a window frame 802 into which a variety of frames shown at 804, 806, 808, and 810 are provided. Frame 804, also commonly referred to as the $0^{th}$ frame, is the base frame on top of which frames 806, 808, and 810 are provided. As will be familiar to those of skill in the art, various frames can perform a variety of independent functions. Thus, in the illustrated exemplary embodiment shown in FIG. 8, frames 806 and 810 provide data viewing regions 816 and 820 respectively which include scroll bars 812 and 814 with which the user can scroll through various data presented in each of the windows independently. Frame 808 by contrast provides a non-scrolling window 818. As mentioned above, the use of frames allows the user to review and examine information from independent sources through the action of independent frames. However, such a configuration provides certain difficulties with respect to the use of applets that modify the browser interface. In particular, since the user can potentially activate different, independent applets through each of the available frames which can lead to conflicts in the appearance of the user interface. In general, the occurrence of such "applet conflicts" should be avoided to provide the user with optimal operation of the interface.

In one embodiment, the above described applet conflicts are avoided by configuring the interface to execute only one applet at a time. Thus, upon the selection of a particular applet in a particular frame, the remaining frames are deactivated, or, the ability to select an applet from the remaining frames is deactivated. Such a technique will be recognized as providing extremely reliable control over applet conflicts although this approach may degrade somewhat the flexibility provided by the frame technology.

Alternatively, the browser can be configured to allow the user to identify a single "active" frame from which an applet can be launched. Only applets launched from active frames will be allowed to run, thus allowing the user to select multiple applets but allowing the user only to execute only one applet at a time. Again, such a configuration would provide the user with a high degree of control over applet conflicts and would allow the user to access multiple applets and retain the use of multiple frames. However, such an approach would tend to be highly modal; thus requiring the user to keep track of which frame was active and would require the user to activate different frames in order to identify which applets are available for execution.

Figure 9:
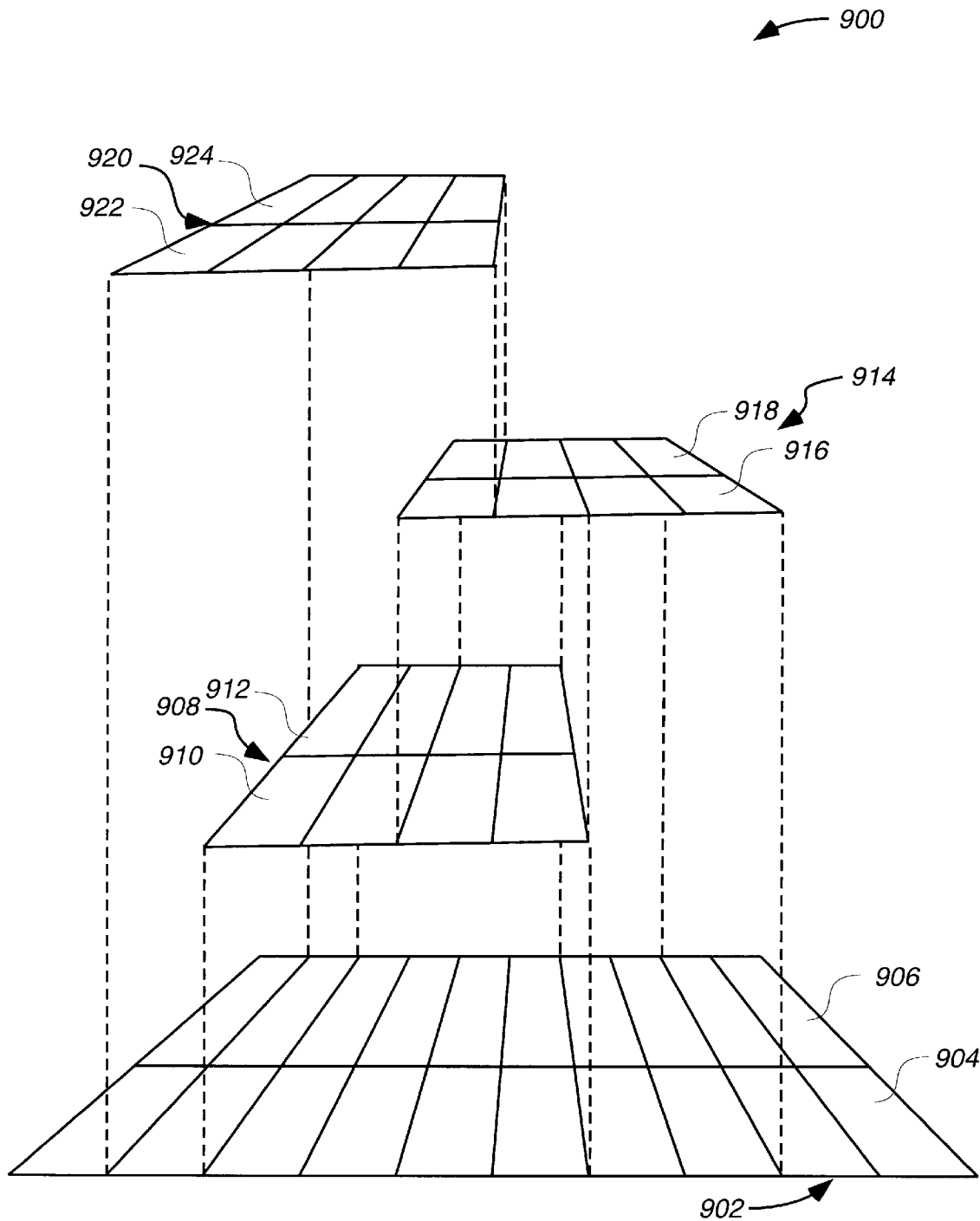
FIG. 9 is a schematic representation of a method for modifying multiple frame browsers such as illustrated in FIG. 8 according to one embodiment of the present invention.

A third alternative embodiment takes advantage of the inheritance structure provided by Java™ and described above with respect to FIG. 6. According to this embodiment, a layered structure of replacement properties settings tables is provided using the above-described inheritance mechanisms. An illustration of such a structure is provided in FIG. 9. As shown in the Figure, a first table 902 including properties and values 904 and 906 is provided for the $0^{th}$, or base, frames of the display (e.g., layer 804 of FIG. 8). As each applet is activated though the various frames a replacement table is generated in accordance with the discussion provided above with respect to FIG. 6. Thus, an applet activated in frame 806 might provide a modified properties settings table such as shown at 908 which includes different properties and corresponding values 910 and 912 respectively. Upon activation of a second applet in frame 808 a second replacement table 914, having properties and values 916 and 918 respectively is provided. Finally, upon activation of a third applet in frame 810, a corresponding third replacement table 920 is provided with properties values 922 and corresponding data values 924 provided. As illustrated in the Figure, each table takes advantage of the inheritance properties of the Java™ properties class to overwrite one or more segments of data on the properties table instantiated previously. Thus, the upper most table, which is associated with the last-activated applet, overwrites portions of the applets launched from the three previous frames. Similarly, the applet launched second-to-last is shown at 914 and overwrites portions of the applet launched portions of the applet launched from the first frame as well as the interface defined by the $0^{th}$ frame. Finally, the applet launched from the first frame overwrites portions of the interface provided by the original interface.

Such a structure as just described would be indicative of an applet execution hierarchy in which the most recently selected applet controls. Alternatively, the same structure can be used but wherein the applets are executed in reverse order of selection. In a second alternative, the order of the properties tables is shuffled according to which frame is being currently used. In a third alternative, the user is enabled to determine the priority by which applets are executed. Because of the unique inheritance properties provided by the Java properties class as described above, great flexibility is provided in which rules can be used to implement the interface provided by the applets being executed. Thus, old properties values tables can be "shuffled" out and new tables shuffled in as applets are terminated and launched.

It will be further appreciated by those of skill in the art that various security measures can be implemented in accordance with the present invention to provide protection for data and the general operating environment at the client machine. In particular, because an applet is an executing program, care must be taken in determining the degree of access to which the applet has over the local client system. In particular, care should be provided so that basic functionalities are retained across all user interfaces, such as the ability to quit the running applet. Other protected features include the control over the reading and writing of data from the client machine and the presentation of "spurious" interfaces into which an unsuspecting user might be instructed to enter sensitive information such as personal identification numbers, encryption keys, or credit card numbers. In one embodiment, these concerns are addressed by providing the user a mechanism for indicating to the applet the degree of control over which the applet will be provided with respect to the local system. Thus, where applets are being provided from servers on highly secure networks, such as an intranet protected by a fire-wall as described above with respect to FIG. 2, the applets may be given a high degree of access to the local machines because the possibility of an applet executing damaging operations is relatively low. Conversely, where systems are being used to download and execute applets from servers over unsecured networks, such as from servers distributed across the Internet, the applet may be provided with very few opportunities to modify the user's system. Still other mechanisms for providing security will be apparent to those of skill in the art.

Thus it will be seen from the foregoing that the present invention overcomes the difficulties associated with diverse networked computer systems by providing a mechanism in which software can be downloaded to networked computers from a central server and executed through a standard browser interface in a platform-independent manner. Using the method system and software provided by the present invention, users can select software from central sources and execute that software on their local machines as if that software was installed originally on those local machines. Thus, it will be appreciated that the present invention largely overcomes the issues of maintaining large numbers of copies of software and appropriate software revisions across large divers computer networks as users can now download software from a single source and execute the software for a limited period without making a great investment in the installation of that software.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media which include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 10:
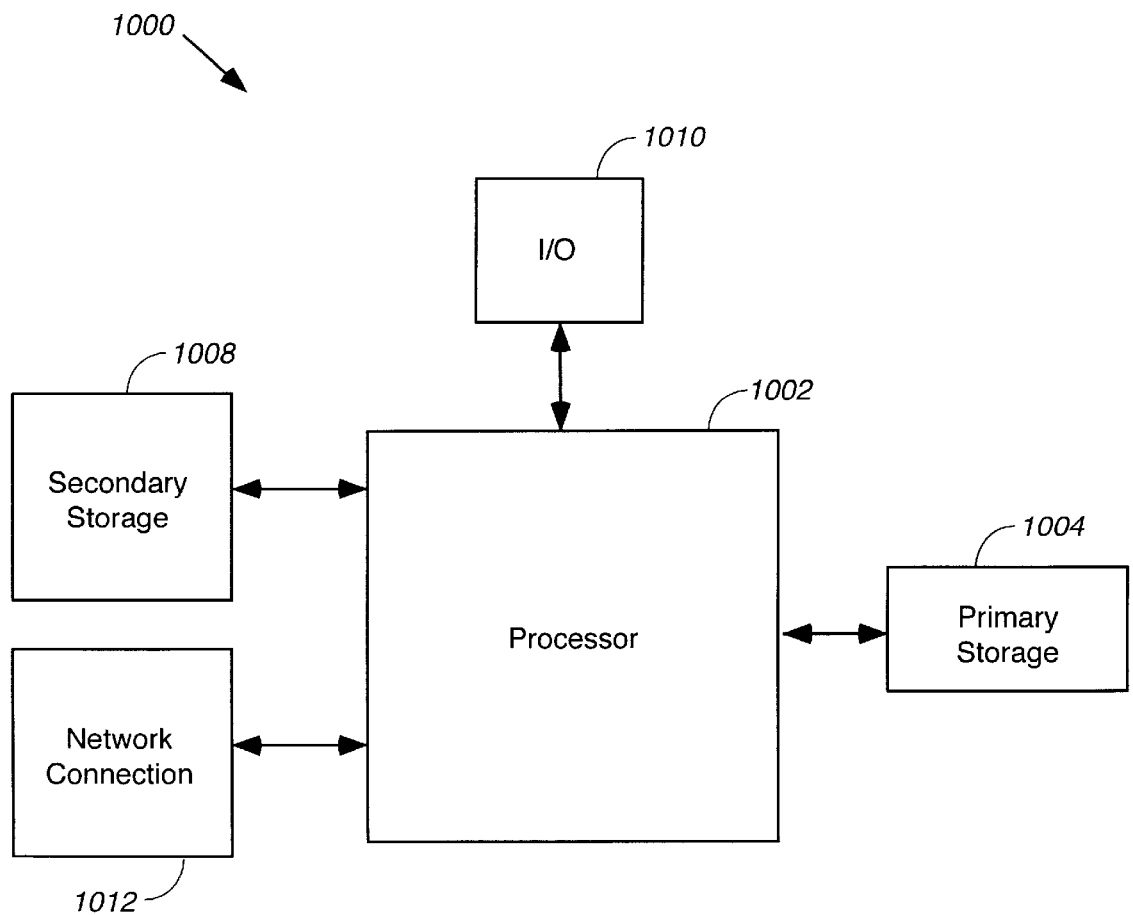
FIG. 10 is a schematic representation of a computer system in accordance with the present invention.

FIG. 10 at 1000 shows a typical computer-based system in accordance with the present invention. The computer includes a processing unit 1002 effective for performing computations, such as, but not limited to, a central processing unit (CPU), or multiple processors including parallel processors or distributed processors. Processor 1002 is coupled with primary memory 1004 such as random access memory (RAM) and read only memory. Typically, RAM includes programming instructions and data, including distributed objects and their associated data and instructions, for processes currently operating on processor 1002. ROM typically includes basic operating instructions, data and objects used by the computer to perform its functions. In addition, a secondary storage device 1008, such as a hard disk, CD ROM, magneto-optical (floptical) drive, tape drive or the like, is coupled bidirectionally with processor 1002. Secondary storage device 1008 generally includes additional programming instructions, data and objects that typically are not in active use by the processor, although the address space may be accessed by the processor, e.g., for virtual memory or the like. The above described computer further includes an input/output source 1010 that typically includes input media such as a keyboard, pointer devices (e.g., a mouse or stylus) and the like. Computer 1000 also includes a network connection 1012. Additional mass storage devices (not shown) may also be connected to CPU 1002 through network connection 1012. It will be appreciated by those skilled in the art that the above described hardware and software elements, as well as networking devices, are of standard design and construction (see, e.g., Herzog 1996).

The computer-implemented methods described herein can be implemented using techniques and apparatus well-known in the computer science arts for executing computer program instructions on computer systems. As used herein, the term "computer system" is defined to include a processing device (such as a central processing unit, CPU) for processing data and instructions that is coupled with one or more data storage devices for exchanging data and instructions with the processing unit, including, but not limited to, RAM, ROM, CD-ROM, hard disks, and the like. The data storage devices can be dedicated, i.e., coupled directly with the processing unit, or remote, i.e., coupled with the processing unit, over a computer network. It will be appreciated that remote data storage devices coupled to a processing unit over a computer network can be capable of sending program instructions to a processing unit for execution on a particular workstation. In addition, the processing device can be coupled with one or more additional processing devices, either through the same physical structure (e.g., in a parallel processor), or over a computer network (e.g., a distributed processor.). The use of such remotely coupled data storage devices and processors will be familiar to those of skill in the computer science arts (see, e.g., Ralston 1993). The term "computer network" as used herein is defined to include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide" areas (e.g., over tens, hundreds, or thousands of miles, WAN), or local area networks (e.g., over several feet to hundreds of feet, LAN). Furthermore, various local- and wide-area networks can be combined to form aggregate networks of computer systems. One example of such a confederation of computer networks is the "Internet".

Although only a few embodiments of the present invention have been described, it should be understood that the present invention may be embodied in many other specific forms without departing from the spirit or scope of the present invention. By way of example, although the invention has been described in terms of a Java GUI and a HotJava presentation engine, any suitable GUI and presentation engine which are platform-independent may be implemented. Therefore, the present examples are to be considered as illustrative and not restrictive, and the invention is not to be limited to the details given herein, but may be modified within the scope of the appended claims and their equivalents.

The following materials are incorporated herein by reference in their entirety and for all purposes.

1. Ralston, Anthony, and Reilly, Edwin D. 1993. *Encyclopedia of Computer Science*. Van Norstrand Reinhold.
2. Herzog, James H. 1996. *Design and Organization of Computing Structures*. Franklin, Beedle & Associates, Inc.
3. Stone, Harold S. 1983. *Microcomputer Interfacing*. Addison Wesley.
4. Martin, James, and Chapman, Kathleen K. 1989. *Local Area Networks: Architectures and Implementations*. Prentice Hall.
5. Flannagan, David. 1996. *Java in a Nutshell: A Desktop Quick Reference for Java Programmers*. O'Reilly & Associates, Inc.
6. Arnold, K. and Gosling, J. 1996. *The Java™ Programming Language*, Addison Wesley.

What is claimed:

1. A method for operating a selected software application on a computer, said selected software application having a software application user interface, the method comprising:

providing browser software capable of running an applet on said computer, said browser software including a browser user interface that includes a frame, said browser software further being effective to identify said selected software application for execution;

selecting said selected software application using said browser user interface; and transmuting said browser user interface into said software application user interface within said frame to allow thereby operation of said selected software application using said transmuted browser user interface.

2. The method of claim 1, further including terminating said software application and restoring said browser user interface by transmuting said software application user interface into said browser user interface.

3. A method for operating a selected software application on a computer, said selected software application having a software application user interface, wherein said software application is located on a server computer that is coupled with said computer through a computer network, the method comprising:

providing browser software on said computer, said browser software including a browser user interface, said browser software further being effective to identify said selected software application for execution;

selecting said selected software application using said browser user interface; establishing a data transfer link between said server and said computer; loading into the memory of said computer a first set of properties settings corresponding to said software application user interface that are effective to transmute said browser user interface into said software application user interface when said first set of properties settings are exchanged for a second set of properties settings corresponding to said browser user interface;

transmuting said browser user interface into said software application user interface to allow thereby operation of said selected software application using said transmuted browser user interface; and terminating said software application and restoring said browser user interface by transmuting said software application user interface into said browser user interface.

4. The method of claim 3, further including storing said second set of properties settings.

5. The method of claim 4, wherein storing said second set of properties settings is performed by said software application.

6. The method of claim 4, wherein storing said second set of properties settings is performed by said browser software.

7. The method of claim 4, wherein transmuting said browser user interface into said software application user interface includes instructing said browser software to update said browser user interface.

8. A method of operating a selected software application on a computer, said selected software application having a software application user interface, the method comprising:

providing browser software on said computer, said browser software including a browser user interface, said browser software further being effective to identify said selected software application for execution, wherein said browser user interface includes a plurality of frames, at least one of said frames being effective to identify and select independently a software application;

selecting said selected software application using said browser user interface; and transmuting said browser user interface into said software application user interface to allow thereby operation of said selected software application using said transmuted browser user interface.

9. The method of claim 8, wherein only one of said frames is active and selecting is performed for the currently active frame.

10. The method of claim 8, wherein only one of said frames is active and transmuting is performed for a software application selected using the currently active frame.

11. The method of claim 8, wherein a plurality of said frames is active simultaneously and transmuting is performed for each frame in which a software application is executing.

12. The method of claim 8, wherein one of said frames is active, and said step of transmuting is performed solely for said active frame when said step of transmuting each frame from which said selected software application produces conflicts between applications.

13. A method of operating a selected software application on a computer, said selected software application having a software application user interface, the method comprising:

providing browser software on said computer, said browser software including a browser user interface, said browser software further being effective to identify said selected software application for execution;

selecting said selected software application using said browser user interface wherein said selected software application comprises an applet; and transmuting said browser user interface into said software application user interface to allow thereby operation of said selected software application using said transmuted browser user interface.

14. The method of claim 13, wherein said applet is an applet written in the Java programming language.

15. A method of operating a selected software application on a computer, said selected software application having a software application user interface, the method comprising:

providing browser software on said computer said browser software including a browser user interface, said browser software further being effective to identify said selected software application for execution;

selecting said selected software application using said browser user interface, wherein said selected software application is an applet written in the Java programming language;

transmitting said selected software application, wherein transmitting the selected software application includes loading a first set of properties settings corresponding to said browser user interface and a second set of properties settings that are effective to transmute said browser user interface into said software application user interface when said first set of properties settings are exchanged for said second set of properties settings, said first set of properties settings and said second set of properties settings each including a table of user interface attributes and attribute values corresponding to said attributes; and transmuting said browser user interface into said software application user interface to allow thereby operation of said selected software application using said transmuted browser user interface.

16. The method of claim 15, wherein said first set of properties settings and said second set of properties settings each comprise software objects such that the software object defining said second set of properties settings has an inheritance relationship with the software object defining said first set of properties settings, wherein the default values of said second set of properties settings are the properties settings of said first set of properties setting parameters, and transmuting said browser software user interface into said software application user interface includes substituting selected default values of said second set of properties settings with properties settings corresponding to said software application user interface.

17. The method of claim 16, further including storing said second set of properties settings.

18. The method of claim 17, wherein storing said second set of properties settings is performed by one of said applet and said browser software.

19. The method of claim 1, wherein transmuting said browser user interface into said software application user interface includes transforming said browser user interface into said software application user interface.

20. The method of claim 16, wherein transmuting said browser user interface into said software application user interface comprises instructing said browser software to update said browser user interface such that said browser user interface is reconstructed using said first set of properties setting values to produce thereby said software application user interface.

21. The method of claim 15, wherein said browser user interface comprises a plurality of frames including a base frame, at least one of said plurality of frames being effective to identify and select independently a software application from said server.

22. The method of claim 21, wherein said base frame is associated with a first set of properties settings and each of said selected software application user interfaces corresponding to software applications selected from said frames is associated with a set of properties settings each comprising software objects having an inheritance relationship with the software object defining said first set of properties settings, and transmuting said browser software user interface into said software application user interface includes substituting selected values of said first set of properties settings with properties settings corresponding to said software application user interfaces.

23. The method of claim 22, wherein only one of said frames is active and selecting is performed for the currently active frame.

24. The method of claim 22, wherein only one of said frames is active and transmuting is performed for a software application selected using the currently active frame.

25. The method of claim 22, wherein a plurality of said frames is active simultaneously and transmuting is performed for each frame from in which a software application is executing.

26. The method of claim 25, wherein one of said frames is active, and transmuting is performed solely for said active frame when transmuting each frame from which said selected software application produces conflicts between the application user interfaces for each of said selected software applications.

27. A method for installing and operating a selected software application on a client computer, said software application having a corresponding software application user interface, and said software application residing on a server computer that is coupled with said client computer through a computer network, the method comprising the steps of:

provided browser software on said client computer, said browser software including a browser user interface and said browser software being effective to identify and download a selected applet onto said client computer for execution, said selected applet having an application user interface;

establishing a data transfer communication link between said client computer and said server computer across said computer network;

selecting said selected applet using said browser software;

transmitting said selected applet from said server computer to said client computer across said computer network; and transmuting said browser user interface into said application user interface to allow thereby operation of said selected applet using said transmuted browser user interface.

28. The method of claim 27, wherein said applet is an applet written in the Java programming language.

29. The method of claim 28, wherein said step of transmitting said selected software application comprises loading a first set of properties settings corresponding to said browser user interface and a second set of properties settings that are effective to transmute said browser user interface into said software application user interface when said first set of properties settings are exchanged for said second set of properties settings, said first set of properties settings and said second set of properties settings each including a table of user interface attributes and attribute values corresponding to said attributes.

30. The method of claim 29, wherein said first set of properties settings and said second set of properties settings each comprise software objects such that the software object defining said second set of properties settings has an inheritance relationship with the software object defining said first set of properties settings, wherein the default values of said second set of properties settings are the properties settings of said first set of properties setting parameters, and said step of transmuting said browser software user interface into said software application user interface includes substituting selected default values of said first set of properties settings with properties settings corresponding to said software application user interface.

31. The method of claim 30, further including the step of storing said second set of properties settings.

32. The method of claim 31, wherein said step of storing said second set of properties settings is performed by said applet.

33. The method of claim 31, wherein step of storing said second set of properties settings is performed by said browser software.

34. The method of claim 30, wherein said step of transmuting said browser user interface into said software application user interface comprises the step of instructing said browser software to update said browser user interface such that said browser user interface is reconstructed using said first set of properties setting values to produce thereby said software application user interface.

35. The method of claim 30, wherein said browser user interface comprises a plurality of frames including a base frame, at least one of said plurality of frames being effective to identify and select independently a software application from said server.

36. The method of claim 35, wherein said base frame is associated with a first set of properties settings and each of said selected software application user interfaces corresponding to software applications selected from said frames is associated with a set of properties settings each comprising software objects having an inheritance relationship with the software object defining said first set of properties settings, and said step of transmuting said browser software user interface into said software application user interface includes substituting selected values of said first set of properties settings with properties settings corresponding to said software application user interfaces.

37. The method of claim 36, wherein only one of said frames is active and said step of selecting is performed for the currently active frame.

38. The method of claim 36, wherein only one of said frames is active and said step of transmuting is performed for a software application selected using the currently active frame.

39. The method of claim 36, wherein a plurality of said frames is active simultaneously and said step of transmuting is performed for each frame in which a software application is being executed.

40. The method of claim 39, wherein one of said frames is active, and said step of transmuting is performed solely for said active frame when said step of transmuting each frame from which said selected software application produces conflicts between the application user interfaces for each of said selected software applications.

41. A computer system for executing a selected software application on a computer, said software application having a software application user interface, said computer system comprising:

a computer coupled with at least one memory device which holds therein browser software including a browser user interface, said browser software capable of running an applet on said computer, and said browser software further being effective to identify a selected software application for execution by said computer, said selected software application being effective to transmute said browser user interface into said software application user interface to allow thereby operation of said selected software application using said transmuted browser user interface when said selected software application is executed by said computer.

42. The computer system of claim 41, wherein said software application is stored on a second memory device coupled with said computer, said memory device coupled with said computer includes a first set of properties settings corresponding to said browser user interface, and said second memory device holds a second set of properties settings that are effective to transmute said browser user interface into said software application user interface when said second set of properties settings are exchanged for said first set of properties settings, wherein each of said first set of properties settings and said second set of properties settings include a table of user interface attributes and attribute values corresponding to said user interface attributes.

43. The computer system of claim 42, wherein said software application comprises an applet.

44. The computer system of claim 43, wherein said applet is an applet written in the Java programming language.

45. The computer system of claim 44, wherein said first set of properties settings and said second set of properties settings each comprise software objects such that the software object defining said second set of properties settings has an inheritance relationship with the software object defining said first set of properties settings, wherein the default values of said second set of properties settings are the properties settings of said first set of properties setting parameters, and said selected software application is configured to substitute selected default values of said second set of properties settings with properties settings corresponding to said selected software application user interface when said selected software application transmutes said browser user interface into said software application user interface.

46. The computer system of claim 41, wherein only one of said frames is active and selecting is performed for the currently active frame.

47. The computer system of claim 46, wherein only one of said frames is active and transmuting is performed for a software application selected using the currently active frame.

48. The computer system of claim 46, wherein a plurality of said frames is active simultaneously and transmuting is performed for each frame in which a software application is being executed.

49. The computer system of claim 46, wherein one of said frames is active, and transmuting is performed solely for said active frame when transmuting each frame from which said selected software application produces conflicts between the application user interfaces for each of said selected software applications.

50. The computer system of claim 49, wherein one of said frames is active, and said step of transmuting is performed solely for said active frame when said step of transmuting each frame from which said selected software application produces conflicts between the application user interfaces for each of said selected software applications.

51. The computer system of claim 50, wherein a base frame is associated with a first set of properties settings and each of said selected software application user interfaces corresponding to software applications selected from said frames is associated with a set of properties settings each comprising software objects having an inheritance relationship with the software object defining said first set of properties settings, and transmuting said browser software user interface into said software application user interface includes substituting selected values of said first set of properties settings with properties settings corresponding to said software application user interfaces.

52. A computer-readable medium comprising computer-readable program code devices configured to cause a computer to:
    display a browser user interface for a browser capable of running an applet on said computer, said browser user interface being effective to control browser software operating on said computer;
    display at least one software application stored on memory coupled with said computer using said browser user interface, said software application having an application user interface;
    identify a selected software application from memory for transfer to said computer; and
    cause the transfer of said selected software application from said memory to said computer such that said transferred selected software application causes a transmuting of said browser user interface into said selected application user interface whereby said selected application can be controlled from said transmuted browser user interface when said selected application is being executed by said computer.

53. The computer readable medium of claim 52, including computer-readable program code devices defining:
    a) a first set of properties settings corresponding to said browser user interface; and
    b) a second set of properties settings that are effective to transmute said browser user interface into said software application user interface when said second set of properties settings are exchanged for said first set of properties settings;
    wherein each of said first set of properties settings and said second set of properties settings include a table of user interface attributes and attribute values corresponding to said user interface attributes.

54. The computer-readable medium of claim 53, wherein said program code devices configured to cause a computer to display said browser user interface define a plurality of frames, at least one of said frames being effective to identify and select independently a software application from said memory.

55. The computer-readable medium of claim 54, wherein said program code devices are configured to cause a computer to activate only one of said frames and wherein said program code devices are configured to allow identification of said selected software application using the currently active frame.

56. The computer-readable medium of claim 55, wherein said program code devices are configured to cause a computer to activate a plurality of said frames and wherein said program code devices are configured to cause a computer to transmute said browser interface for each software application which is selected from a frame.

57. The computer-readable medium of claim 56, wherein said program code devices are configured to cause a computer to activate one of said frames and wherein said program code devices are configured to cause a computer to transmute said browser user interface solely for said active frame when said transmuting produces conflicts among the application user interfaces for each of said selected software applications.

58. The computer-readable medium of claim 55, wherein said software application comprises an applet.

59. The computer-readable medium of claim 58, wherein said applet is an applet written in the Java programming language.

60. The method of claim 59, wherein said computer-readable program code devices configured to cause a computer to display said browser user interface comprise computer-readable program code devices which define a plurality of frames including a base frame, at least one of said plurality of frames being effective to identify and select independently a software application from said memory.

61. The method of claim 60, wherein said base frame is associated with a first set of properties settings and each of said selected software application user interfaces corresponding to software applications selected from said frames is associated with a set of properties settings each comprising software objects having an inheritance relationship with the software object defining said first set of properties settings, and said step of transmuting said browser software user interface into said software application user interface includes substituting selected values of said first set of properties settings with properties settings corresponding to said software application user interfaces.

62. The computer-readable medium of claim 61, wherein said program code devices are configured to cause a computer to activate only one of said frames and wherein said program code devices are configured to allow identification of said selected software application using the currently active frame.

63. The computer-readable medium of claim 61, wherein said program code devices are configured to cause a computer to activate a plurality of said frames and wherein said program code devices are configured to cause a computer to transmute said browser interface for each software application which is selected from a frame.

64. The computer-readable medium of claim 61, wherein said program code devices are configured to cause a computer to activate one of said frames and wherein said program code devices are configured to cause a computer to transmute said browser user interface solely for said active frame when said transmuting produces conflicts among the application user interfaces for each of said selected software applications.

65. A computer-readable medium comprising computer-readable program code devices configured to cause a computer to transmute the interface of a browser software application being executed on said computer into the application user interface of an application selected by said browser software application, said browser software application capable of running an applet on said computer, whereby said selected application is controlled from said transmuted browser user interface.

* * * * *